March 15, 1927.  E. E. BASHOR ET AL  1,620,937

TRACTOR HITCH

Filed May 3, 1926   2 Sheets-Sheet 1

Inventors
Emery E. Bashor,
Edward N. Wray.

By _____
Attorney

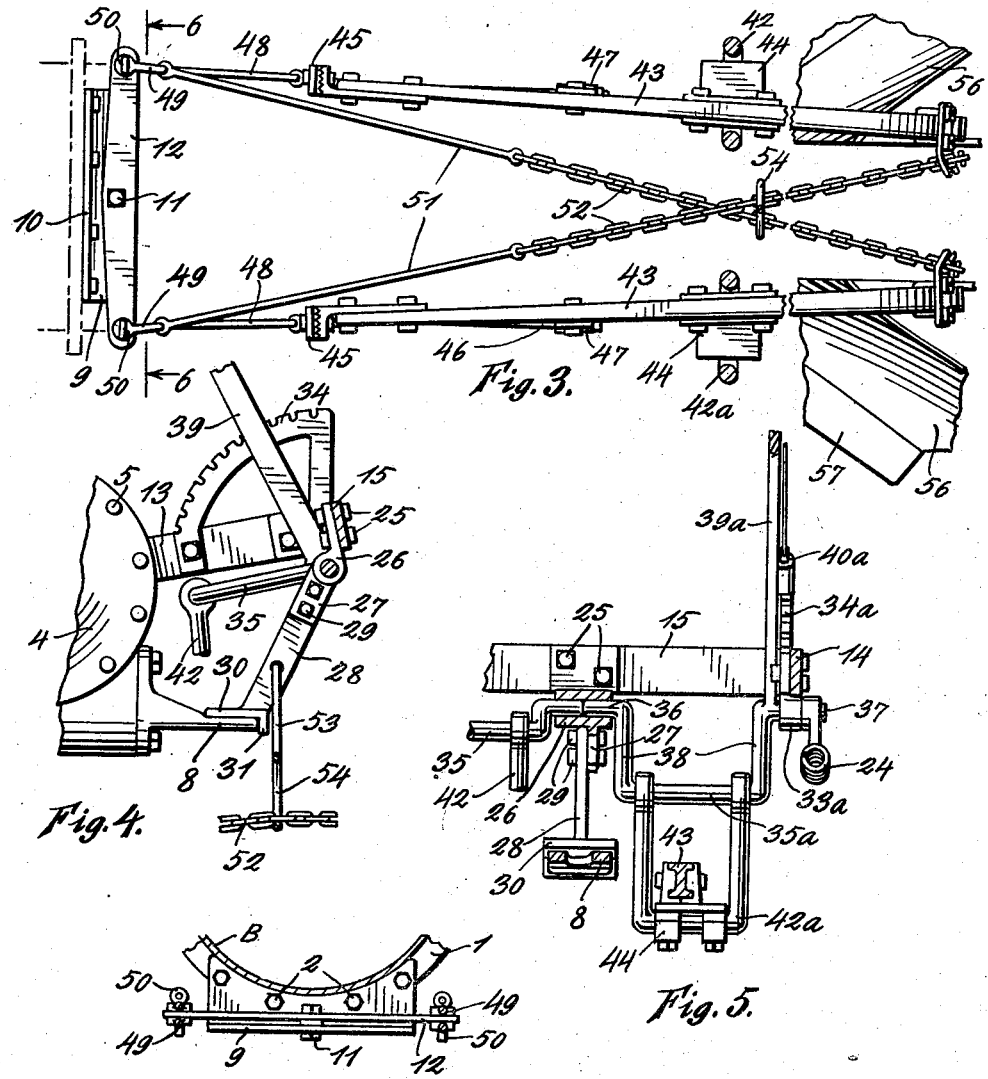

Patented Mar. 15, 1927.

1,620,937

UNITED STATES PATENT OFFICE.

EMERY E. BASHOR AND EDWARD N. WRAY, OF BERTHOUD, COLORADO.

TRACTOR HITCH.

Application filed May 3, 1926. Serial No. 106,388.

This invention relates to improvements in tractor hitch devices and has reference more particularly to that particular class of tractor hitches that are used for hitching two way plows to tractors.

It is now generally conceded that plowing can be most effectively performed by means of tractors and this has led to the rapid adoption of tractors for this purpose. Experience has shown, however, that the satisfactory use of a tractor for plowing is dependent to a great extent upon the manner in which the plows are secured to the tractor. It is, for example, necessary that the plows shall be so connected to the tractor that they may be easily raised for transportation and lowered and that the depth of the furrow shall be easily controlled. If the field contains stones, roots or other obstructions, it is desirable that the plow shall be able to raise itself out of the ground because if it can not do this it will frequently be broken or damaged. The hitch should also be so constructed that it will eliminate to as great an extent as possible side draft, and besides all this the hitch should be so made that it and the plows can readily be removed.

The tractor hitch that forms the subject of this invention is designed so that the different advantages pointed out above are attained and which in addition is of very simple but of a substantial construction which can be quite cheaply made and readily assembled and attached to the tractor.

The hitch that forms the subject of this invention can be most clearly described and will be most readily understood when reference is had to the accompanying drawings in which the preferred form of the invention has been illustrated and in which:

Fig. 3 is a view taken on line 3—3, Fig. 2;

Fig. 4 is a section taken on line 4—4, Fig. 1;

Fig. 5 is a section taken on line 5—5, Fig. 2;

Fig. 6 is a section taken on line 6—6, Fig. 3; and

Fig. 7 is a section taken on line 7—7, Fig. 2.

Figure 1:
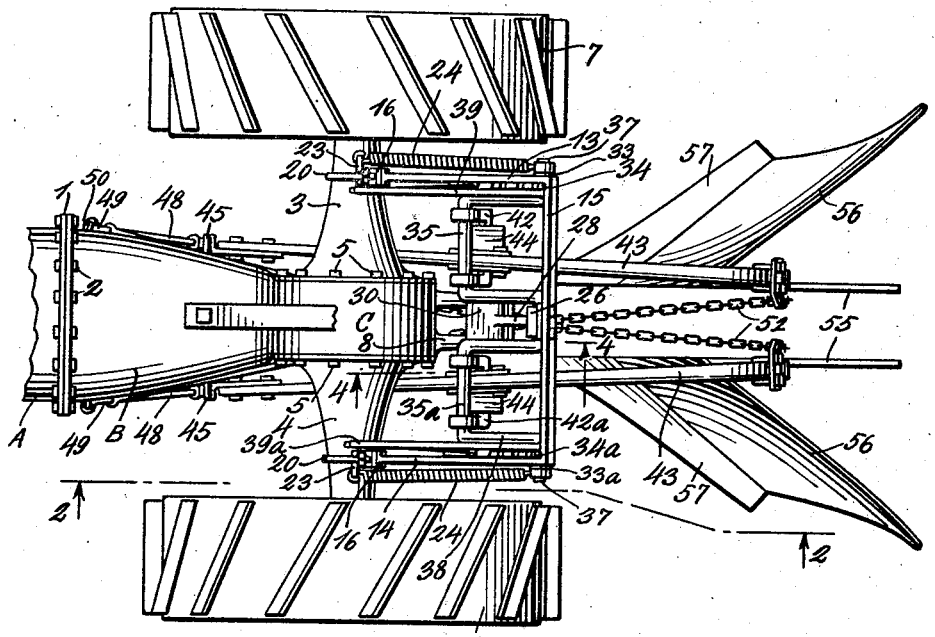
Fig. 1 is a top plan view of the rear end of a tractor to which a two way plow has been attached by means of the hitch that forms the subject of this invention.

In the drawings the invention has been shown in its relation to the tractor and to the plows. As the hitch is attached to the rear of a tractor and is not directly dependent on the steering mechanism or interior construction, only those parts of the tractor that cooperate with the hitch have been illustrated.

The two parts A and B of the tractor are each provided with flanges 1 and these flanges are perforated for the reception of clamping bolts 2. The rear end of the section B has a cylindrical portion C that forms the outer wall of the transmission housing to the ends of which the axle housing sections 3 and 4 are secured by means of top bolts 5. A two part axle 6 extends through the rear axle housing and to the outer end of each section a drive wheel 7 is secured. Projecting rearwardly from the underside of section C is a perforated lug 8. A plate of angular cross section having flanges 9 and 10 is secured against the flange 1 of the member B by means of bolts 2 in the manner shown in Fig. 6. The vertical flange 10 is curved in the manner shown so as to conform to the curvature of the section B. The horizontal flange 9 has a central opening for the reception of a pin 11 that serves as a pivot for the evener 12 to which reference will be made hereinafter. The main part of this hitch comprises a supporting frame having two parallel sides 13 and 14 and a straight connecting member 15. The ends of the side members 13 and 14 are each provided with an arcuate portion 16 whose ends 17 and 18 (Fig. 7) extend radially. The end 17 has a hole for the reception of the eye 19 of the clamping bolt 20 and the end 18 is forked in the manner indicated by numeral 21. The end of the bolt 20 that is located in the notch 21 is provided with a nut 22 that serves as an adjusting means. The end 18 is also provided with a lug or ear 23 to which one end of the spring 24 is anchored. Secured to the front side of the transverse portion 15 by means of bolts 25 is a bearing 26. This bearing has a projection 27 that is downwardly and forwardly inclined and to this the upper end of the support 28 is secured by means of bolts 29. The lower end of support 28 has a foot 20 that is adapted to rest upon the upper surface of the lug 8, in the manner shown in Fig. 4. The heel 31 is adapted to prevent forward sliding of the foot 30. It will now be evident that the frame comprising parts 13, 14 and 15 is positively prevented from moving downwardly beyond the position shown in Figs. 2 and 4 but it can move freely upwardly or in a counter clockwise direction. Bearings 33 and 33ª are secured to the side members 13 and 14, respectively, and are each provided with a quadrant 34, 34ª. U-shaped yoke members 35 35ª are pivoted respectively between the bearings 25, 33 and 26, 33ª. As these U-shaped members are identical except that one is a "right" and the other a "left", we will limit our description to member 35ª (Fig. 5). It will be noticed that this member has its ends 36 and 37 bent at right angles to the parallel side members 38 so that the ends 36 and 37 are in axial alignment. A handle 39ª is welded to one of the side members 38 and is provided with a pawl 40ª that is adapted to engage the notches 41ª in the quadrant 34ª.

Figure 2:
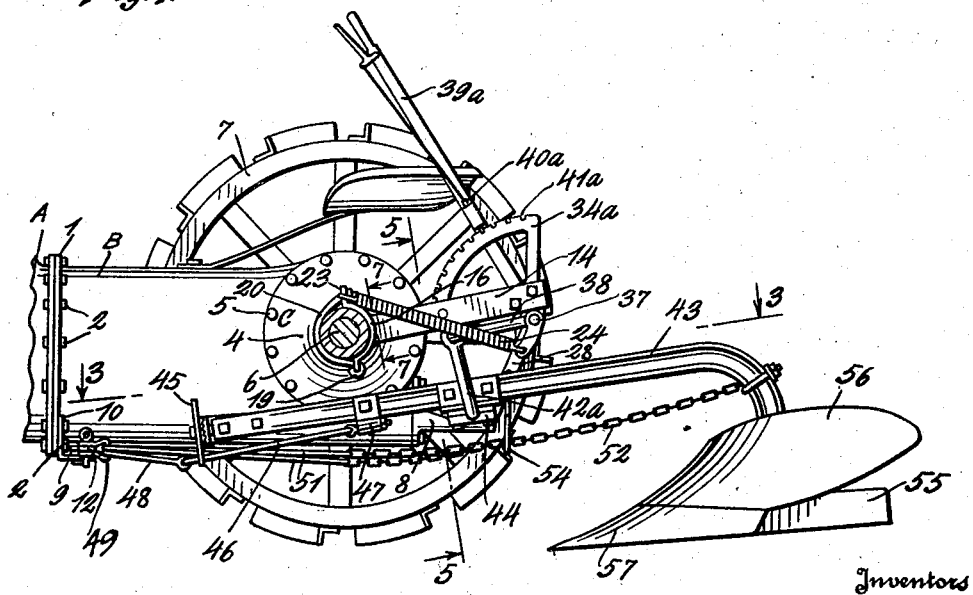
Fig. 2 is a section taken on line 2—2, Fig. 1.

From Fig. 2 it will be seen that the axis of the handle forms an angle of less than ninety degrees with the plane of the U-shaped member and since the handle is welded to the U-member the latter can be rotated about the axis of the ends 36 and 37 and held in adjusted position by the pawl 40ª and the quadrant 34ª. Pivoted at their ends to the transverse portions 35 and 35ª are U-shaped bails 42 and 42ª which enclose the plow beams 43 and are journaled in bearings 44. When the handle 39ª is moved about its pivot the beam 43 will be moved up or down as may be desired. The forward ends of the beams 43 are each provided with a transverse plate 45 whose lower end has a notch or hole through which the rod 46 extends. The rear end of this rod is anchored to the beam at 47. Secured to the front end of each rod 46 is a link 48 whose free end is attached to a clevis 49 that in turn is pivoted to the end of the evener 12 (Fig. 3) by means of a pin 50. Rods 51 are also secured to the clevises 49 at one end and to chains 52 at the other end. In Fig. 3 I have shown how the rear end of each beam 43 is attached to one end of the evener 12 by means of the rod 51 and chain 52 while the front end of each beam is attached to the other end of the evener by means of the rods 46 and 48. It is now apparent that the force required to pull each of the plows, is transmitted to the plow from opposite ends of the evener 12 and is substantially equally distributed between the front and the rear of the beam. The resultant of these forces must pass through the pivot 11 and it is therefore evident that the force is applied to the tractor at the center line thereof. Secured to the support 28 is a rod 53 whose lower end is bent into the form of a ring 54 through which the chains 52 pass and by which they are supported.

When the handles 39 or 39ª are moved so as to raise or lower the plows, the bails 42 or 42ª will pivot on 35 and 35ª and this makes it possible to raise and lower the plows without the back and forth movement which would take place if the plows were connected directly to the parts 35 and 35ª. This is an important feature of the construction. The fact that the plows are also supported by a framework that permits them to move upwardly whenever this is necessary is also of great value as this floating support removes the danger of breakage.

The plows are such as are ordinarily employed and form no part of this invention except in so far as they are elements of the combination and are each provided with the ordinary landside 55, moldboard 56 and a plow share 57.

Attention is called in particular to the ease with which the plows may be detached as it is merely necessary to remove the pivot pin 11 and the nuts 22 in order to remove the plows and the entire hitch device with the exception of the angular attaching plate. If it is preferred, the pivot 11 may be left in place and the pins 50 removed from the clevises, in either case the disconnection can be made very easily and quickly.

By the simple expedient of attaching the evener to the tractor to the front of the rear axle, several advantages are secured among which may be mentioned a smaller variation in the depth of the furrow due to the fact that the point of hitch is located between the front and rear axles and is therefore subjected to a smaller vertical movement due to irregularities of the ground than a point at or to the rear of the rear axle and besides this it makes the point accessible for connecting and disconnecting the plows.

We desire to call particular attention to the fact that the front end of the beams are connected to the tractor by means of the link 48 and bar 46 in such a manner that this end of the beam can freely move up and down and also to a limited extent sidewise. This mode of connection gives great flexibility and permits the plow to adjust itself quite readily to inequalities in the ground. A further advantage of this connection is that when the plow is raised the front end of the beam will be moved upwardly to such an extent that the under surface of the plow will be upwardly inclined whereby the plow will simply slide out of the ground by the resultant of the forces exerted thereon by the tractor and thus reducing to a minimum the force that the operator must apply to the levers. The springs 24 are so connected to the bails 38 that they assist in raising the plows.

We have heretofore called particular attention to the fact that the main U-shaped frame is pivoted to the axle housing and free to move upwardly but limited in its downward movement by the stop 28. This construction is very important because it often happens that the fields that are being plowed have ditches or other depressions into which the tractor wheels drop and unless the plows were so attached that they could freely move upwardly, the entire weight of the tractor would have to be supported by the plows when these conditions occurred. This is prevented by the floating construction described above.

Having now described the invention what is claimed as new is:

1. In combination with a tractor having a differential housing, an axle housing extending outwardly from each side thereof, a lug extending rearwardly from the differential housing, a U-shaped frame having its ends pivotally secured to the axle housing on opposite sides of the differential housing and a support member secured to the frame and adapted to engage the lug so as to prevent the frame from moving downwardly.

2. In combination with a tractor having a differential housing, an axle housing extending outwardly from each side thereof, a lug extending rearwardly from the differential housing, a U-shaped frame having its ends pivotally secured to the axle housing on opposite sides of the differential housing, a support member secured to the frame and adapted to engage the lug so as to prevent the frame from moving downwardly and a U-shaped bail pivotally secured to the frame and means for rotating said bail about its pivots and for locking it against movement.

3. In combination with a tractor having a differential housing, an axle housing extending outwardly from each side thereof, a lug extending rearwardly from the differential housing, a U-shaped frame having its ends pivotally secured to the axle housing on opposite sides of the differential housing, a support member secured to the frame and adapted to engage the lug so as to prevent the frame from moving downwardly and a U-shaped bail pivotally secured to the frame, a second U-shaped bail pivotally attached to the first bail, means for rotating the first mentioned bail about its pivots so as to adjust it with respect to the frame and means for locking it in adjusted position.

4. In combination with a tractor having a differential housing, an axle housing extending outwardly from each side thereof, a lug extending rearwardly from the differential housing, a U-shaped frame having its ends pivotally secured to the axle housing on opposite sides of the differential housing, a support member secured to the frame and adapted to engage the lug so as to prevent the frame from moving downwardly and a U-shaped bail pivotally secured to the frame, a second U-shaped bail pivotally attached to the first bail, a plow beam having its forward end attached to the tractor, means for attaching the beam to the second bail, means for rotating the first named bail about its pivot so as to adjust its position with respect to the frame and means for locking it in adjusted position.

5. A tractor hitch comprising an evener pivotally attached to the tractor, a plow beam, means for attaching the front end of said beam to one end of the evener end, means for attaching the rear end of said beam to the other end of the evener, and means for raising and lowering the beam, said means comprising a U-shaped frame secured to the tractor, a bail adjustably secured to the frame, means for holding said bail in adjusted position and a second U-shaped bail secured to the plow beam and pivoted to the first mentioned bail.

6. A tractor hitch for securing a plow to a tractor having a rear axle housing, an evener, pivotally attached to the underside of the tractor to the front of the rear axle, a plow beam, means for securing the front end of said beam to one end of the evener, means for securing the rear end of the beam to the other end of the evener, and means for raising and lowering the beams comprising a U-shaped frame pivoted to the axle housing, means for holding the frame against movement in one direction, a U-shaped bail pivotally secured to the frame, a second U-shaped bail secured to the beam and pivoted at its ends to the first bail and means for holding the first mentioned bail in adjusted position with respect to the frame.

In testimony whereof we affix our signatures.

EMERY E. BASHOR.
EDWARD N. WRAY.